US012689595B2

(12) United States Patent
Sohan et al.

(10) Patent No.: US 12,689,595 B2
(45) Date of Patent: Jul. 21, 2026

(54) SYSTEMS AND METHODS FOR SCALABLE COMMUNICATIONS

(71) Applicant: Xilinx, Inc., San Jose, CA (US)

(72) Inventors: Ripduman Sohan, San Jose, CA (US); David Riddoch, Cambridge (GB); Steven Pope, Cambridge (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/394,731

(22) Filed: Dec. 22, 2023

(65) Prior Publication Data

US 2025/0211546 A1 Jun. 26, 2025

(51) Int. Cl.
*G06F 15/167* (2006.01)
*H04L 47/76* (2022.01)
*H04L 67/1097* (2022.01)

(52) U.S. Cl.
CPC .......... *H04L 47/76* (2013.01); *H04L 67/1097* (2013.01)

(58) Field of Classification Search
CPC ........................... H04L 47/76; H04L 67/1097
See application file for complete search history.

(56) References Cited

U.S. PATENT DOCUMENTS

| | | | | |
|---|---|---|---|---|
| 2005/0080982 A1* | 4/2005 | Vasilevsky | ............ | G06F 3/0607 |
| | | | | 711/1 |
| 2007/0268910 A1* | 11/2007 | Shen | ....................... | H04L 69/40 |
| | | | | 370/395.21 |
| 2015/0262135 A1* | 9/2015 | Yoder | .................... | G06Q 20/40 |
| | | | | 705/44 |
| 2018/0020054 A1* | 1/2018 | Woodacre | ........... | H04L 67/1097 |
| 2018/0242393 A1* | 8/2018 | Wei | ........................ | H04W 28/26 |
| 2021/0263779 A1* | 8/2021 | Haghighat | ............ | G06F 9/5061 |
| 2022/0174096 A1* | 6/2022 | Schmitt | ................. | H04L 63/102 |
| 2022/0229787 A1* | 7/2022 | Veluswamy | ........ | G06F 13/1668 |

* cited by examiner

*Primary Examiner* — Yves Dalencourt
(74) *Attorney, Agent, or Firm* — Greenberg Traurig, LLP

(57) ABSTRACT

Described herein are systems and methods for scalable communications. A circuit can receive a request from an application to communicate with a destination over a network. The circuit can identify the destination from information included in the request. In a first case that resources have been allocated for communicating with the destination identified from the request, the circuit can communicate data to the destination over the network using the resources that have been allocated. In a second case that resources have not been allocated for communicating with the destination identified from the request, the circuit can allocate resources for communicating the data with the destination. The circuit can communicate the data to the destination over the network using the resources that have been allocated.

20 Claims, 6 Drawing Sheets

500

400

Server
406

Network Environment
105A

Network
104

Computing Device
402

Network Environment
105B

Start

Receive a request from an application to communicate with a destination
502

Identify information about the destination from the request
504

Resources are allocated for communicating with the destination?
506

No

Reallocate resources for communicating with the destination
508

Yes

Use the allocated resources to communicate with the destination
510

End

500

600

SYSTEMS AND METHODS FOR SCALABLE COMMUNICATIONS

BACKGROUND

Messages can be transmitted among different devices or among various hardware and software components with different capabilities and/or functionalities. Such messages may be transmitted over a network in some cases, such as a network-on-a-chip (NoC), a wired communication network, a wireless communication network, or other physical layer. A variety of network protocols may also be used.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
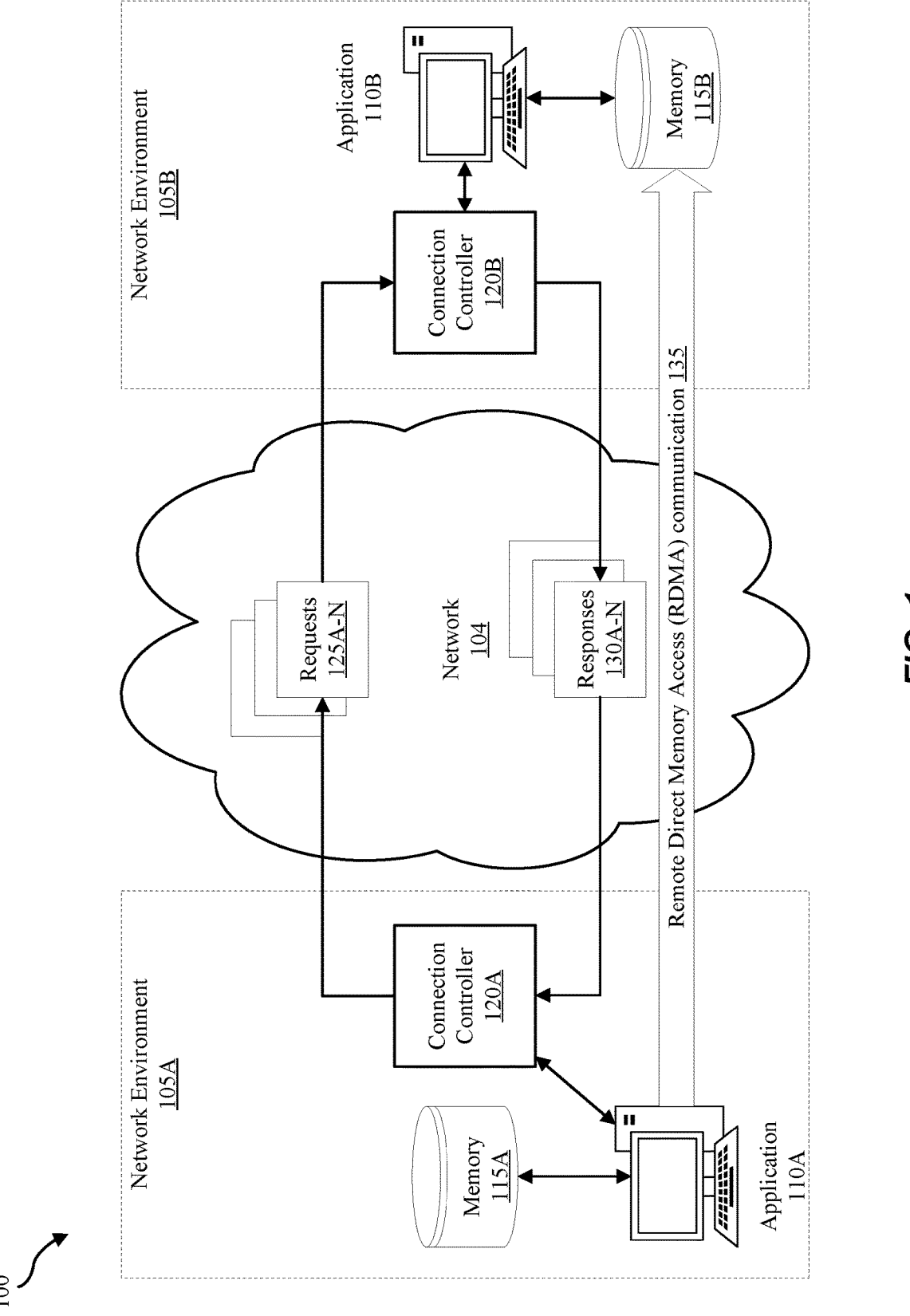
FIG. 1 is a block diagram of an example system for scalable communications using hardware components.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION

Described herein are examples of systems and methods for scalable communications. By leveraging firmware and hardware to facilitate scalable communications (e.g., scalable transport) between an initiator and a target, applications can communicate with remote nodes (e.g., via Remote Direct Memory Access (RDMA)) over a set number of reusable queue pairs (QPs) instead of each device pair having to maintain a unique RDMA QP. Such techniques can reduce memory usage and cache miss rates when compared to existing techniques that require an exchange of state information to activate the connections and reservation of a QP regardless of utilization of the QP or the connection. Some techniques described herein can disconnect connections after an idle timeout and quickly reconnect the connections regardless of application state. Some such techniques can reduce the resource consumption for an application to manage connection state. Such control over connection and disconnection can allow for managing connections for each function of an application. In some implementations, the control may be performed by hardware, firmware, and/or software. For example, in some implementations hardware may be used to set up and manage active connections, and firmware may be used to store information regarding and manage a (in some implementations, potentially larger) number of connections that may be active and/or inactive at a time. In this way, a smaller amount of resources may be allocated to communications (e.g., communications using RDMA) as compared to conventional approaches that maintained fixed resources for every communication pair or connection, regardless of utilization of communications between the pair or utilization of the connection.

Some examples described herein include systems and methods for initiating scalable communications. A circuit can receive a request from an application to communicate with a destination over a network. The circuit can identify the destination from information included in the request. In a first case that resources have been allocated to the destination identified from the request, the circuit can communicate data to the destination over the network using the resources that have been allocated. In a second case that resources have not been allocated to the destination identified from the request, the circuit can allocate resources to communicate the data to the destination. The circuit can communicate the data to the destination over the network using the resources that have been allocated.

Some examples described herein additionally or alternatively include systems and methods for maintaining scalable communications. The circuit can allocate resources for an application associated with a device to receive data via RDMA from a sender over a network. The circuit can initiate a timer corresponding to receipt of the data via the RDMA from the sender over the network. In response to expiration of the timer, the circuit can deallocate the resources for receiving the data via the RDMA from the sender over the network, Attempts have previously been made at communication between nodes, but the inventors have recognized and appreciated that prior solutions necessitated the application and software management layer to maintain resource allocations between all pairs of nodes to facilitate the connections between the nodes. For example, one machine can end up contacting up to 256,000 other nodes to transfer data or access memory on other nodes. RDMA can use QPs, but each specific QP would be established and held for every connection. In the above example, the application and software management layer would have to configure queues for each transmitting node, and one for each queue pair for a total of 256,000 queue pairs. Moreover, the QPs would need to be managed using inefficient approaches involving dynamic transport and firmware. For example, a software management layer can be utilized for establishing end-to-end connections between nodes. Such approaches may also result in limits of how many requests can be handled per node and may involve application-based connection setup and teardown to communicate with nodes or exchange peer state information to communicate with nodes.

The inventors have realized there can be advantages to avoiding the application and software layer, decreasing resource consumption, minimizing software changes, and/or instantiating connections quickly. In some implementations described herein, direct and dynamic communication with the nodes can avoid explicit application-based connection setup and teardown. Instead, in these implementations, the connections can be quickly set up because peer state information does not need to be exchanged before establishing the connections.

Described herein are examples of techniques for scalable communications. Such techniques can reduce memory utilization and reduces cache miss rates. Some techniques described herein also require less programming and configuration for applications to utilize scalable transport by removing the need for the application or software management layer to facilitate connections between nodes. The use of scalable transport can allow for faster re-use and scalability of connections by removing or reducing application bottlenecks or state exchanges that can limit the number of connections that can be supported between nodes.

In some implementations, hardware can be utilized with software for connection management and setup. The firmware can be used to handle a large number of connections handled by the hardware. The firmware can use the hardware to allocate connections, determine whether data can be transmitted via an existing connection or if a new connection is necessary, and to communicate with other nodes.

To manage the large number of connections, in some implementations, idle connections can be disconnected and while static connections can be reconnected without using the application or software layer. In some implementations, the combination of firmware and hardware can allow for handling connection handshakes between nodes by allocating the connections and specifying parameters to establish the connections. A connection protocol can manage the connection and disconnection of connections. In some implementations, the firmware can use the hardware to make connection setup stateless by using connection requests and responses. These requests and responses are sent as packets, which can be validated and authenticated. The requests can be made by an initiator node to a target node. The target node can respond to the requests to establish a scalable transport connection with the initiator node. If the requests timeout or the responses are dropped, the firmware can reduce resource consumption by the hardware by disconnecting the associated connection.

In some implementations, the hardware and the firmware can be configured for connection management for each function of the application. In some implementations, the connections can be managed at the kernel level. For example, such management can involve the firmware accessing hardware, such as to maintain timeout timers and counters for error handling, to establish connections with connect messages and to disconnect the connections with disconnect messages.

As will be described in greater detail below, the present disclosure describes various systems and methods for scalable communications.

In some implementations, the techniques described herein relate to a method for initiating scalable communications, the method being performed with at least one circuit, the method including: receiving a request from an application to communicate with a destination over a network; identifying the destination from information included in the request; in a first case that resources have been allocated to the destination identified from the request, communicating data to the destination over the network using the resources that have been allocated; and in a second case that resources have not been allocated to the destination identified from the request, allocating resources to communicate the data to the destination; and communicating the data to the destination over the network using the resources that have been allocated.

In some implementations, the techniques described herein relate to a method, wherein: receiving the request from the application to communicate with the destination includes receiving the data to be communicated from the application to the destination and the information indicating the destination.

In some implementations, the techniques described herein relate to a method, wherein: the request from the application to communicate with the destination is to communicate the data to the destination using Remote Direct Memory Access (RDMA).

In some implementations, the techniques described herein relate to a method, wherein: the resources are for maintaining at least one Remote Direct Memory Access (RDMA) queue pair for communicating with the destination.

In some implementations, the techniques described herein relate to a method, wherein: allocating the resources to communicate with the destination includes reallocating a Remote Direct Memory Access (RDMA) queue pair that was, prior to reallocating, allocated to communicating via RDMA with a different destination.

In some implementations, the techniques described herein relate to a method, further including: prior to allocating the resources to communicate the data to the destination, disconnecting another Remote Direct Memory Access (RDMA) queue pair with the different destination.

In some implementations, the techniques described herein relate to a method for maintaining scalable communications, the method being performed with at least one circuit, the method including: allocating resources for an application associated with a device to receive data via Remote Direct Memory Access (RDMA) from a sender over a network; initiating a timer corresponding to receipt of the data via the RDMA from the sender over the network; and in response to expiration of the timer, deallocating the resources for receiving the data via the RDMA from the sender over the network.

In some implementations, the techniques described herein relate to a method, further including: resetting the timer responsive to the receipt of the data via the Remote Direct Memory Access (RDMA) from the sender over the network.

In some implementations, the techniques described herein relate to a method, wherein: allocating the resources includes maintaining a Remote Direct Memory Access (RDMA) queue pair with the sender over the network.

In some implementations, the techniques described herein relate to a method, wherein: deallocating the resources includes disconnecting a connection via Remote Direct Memory Access (RDMA) with the sender via the network.

In some implementations, the techniques described herein relate to a system for scalable communications, the system including: a first connection controller circuit configured to: receive a request from an application to communicate with a destination over a network; identify the destination from information included in the request; in a first case that resources have been allocated to the destination identified from the request, communicate data to the destination over the network using the resources that have been allocated; and in a second case that resources have not been allocated to the destination identified from the request, allocate resources to communicate the data to the destination; and communicate the data to the destination over the network using the resources that have been allocated.

In some implementations, the techniques described herein relate to a system, wherein: receiving the request from the application to communicate with the destination includes receiving the data to be communicated from the application to the destination and the information indicating the destination.

In some implementations, the techniques described herein relate to a system, wherein: the request from the application to communicate with the destination is to communicate the data to the destination using Remote Direct Memory Access (RDMA).

In some implementations, the techniques described herein relate to a system, wherein: the resources are for maintaining at least one queue of a Remote Direct Memory Access (RDMA) queue pair for communicating with the destination.

In some implementations, the techniques described herein relate to a system, wherein: allocating the resources to communicate with the destination includes reallocating a Remote Direct Memory Access (RDMA) queue pair that was, prior to reallocating, allocated to communicating via RDMA with a different destination.

In some implementations, the techniques described herein relate to a system, wherein the first connection controller circuit is further configured to: prior to allocating the resources to communicate the data to the destination, disconnect a Remote Direct Memory Access (RDMA) communication with the different destination.

In some implementations, the techniques described herein relate to a system, wherein the application is a first application, the resources are a first set of resources, and further including a second connection controller circuit configured to: allocate a second set of resources for a second application associated with the second connection controller circuit to receive the data via Remote Direct Memory Access (RDMA) from the first application associated with the first connection controller circuit over the network; initiate a timer corresponding to receipt of the data via the RDMA from the first application over the network; and in response to expiration of the timer, deallocate the resources for receiving the data via the RDMA from the first application over the network.

In some implementations, the techniques described herein relate to a system, wherein the second connection controller circuit is further configured to: reset the timer responsive to the receipt of the data via the Remote Direct Memory Access (RDMA) from the first application over the network.

In some implementations, the techniques described herein relate to a system, wherein the second connection controller circuit is further configured to: allocate the resources includes maintaining a Remote Direct Memory Access (RDMA) queue pair with the first application over the network.

In some implementations, the techniques described herein relate to a system, wherein: deallocating the resources includes disconnecting a connection via Remote Direct Memory Access (RDMA) with the first application via the network.

Features from any of the implementations described herein can be used in combination with one another in accordance with the general principles described herein. These and other implementations, features, and advantages will be more fully understood upon reading the following detailed description in conjunction with the accompanying drawings and claims.

Below are provided, with reference to FIGS. 1-4, detailed descriptions of example systems for scalable communications. Detailed descriptions of examples of computer-implemented methods are also provided in connection with FIGS. 5-6. It should be appreciated that while example implementations are provided, other implementations are possible, and implementations are not limited to operating in accordance with the examples below.

FIG. 1 is a block diagram of an example system 100 for scalable communications. As illustrated in this figure, example system 100 can include a network 104 for facilitating communications between the network environment 105A and the network environment 105B.

Network 104 can generally represent any medium or architecture capable of facilitating communication or data transfer. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

In some implementations, the network environment 105A is a network device that includes the connection controller 120A, the application 110A, and the memory 115A. In some implementations, the network environment 105B is a network device that includes the connection controller 120B, the application 110B, and the memory 115B. The network environment 105A can include an application 110A coupled to memory 115A. The application 110A can request the connection controller 120A to allocate resources for communicating with the connection controller 120B of the network environment 105B for the application 110A to communicate with memory 115B coupled to an application 110B. The connection controller 120B can transmit responses 130A-N to the connection controller 120A. After the connection controller 120A receives the responses 130A-N from the connection controller 120B, the connection controller 120A can allow the application 110A to establish RDMA communication 135 with the memory 115B.

In some implementations, the network environments handle CQPs (e.g., Standard unreliable diagram (UD) QPs) used to send connect and disconnect messages to remote peers and to deliver (depending on configuration) received messages to either firmware or the host driver. For example, a UD connection is called the Connection QP (CQP) and transmits and receives connection and disconnection requests and responses among the connection controllers. In some implementations, the network environments handle Backing Queue Pairs (BQPs) (e.g., standard reliable connection (RC) QPs allocated in function-level system memory) to provide request/response servicing capabilities for the RDMA communication 135. For example, RC connections can be called the BQPs that are used to communicate standard RC requests and responses among network environments. When the RDMA communication 135 are allocated, the connection controllers can allocate a CQP from the function QP table. When the RDMA communication 135 are allocated, the connection controllers can allocate several BQPs to support the RDMA communication 135. The connection controllers can return the communication and BQP references to the driver that return a handle to the connection controller and the application.

In some implementations, the leveraging of RC and UD as standard connection protocols for both operations and connection management allows the RDMA communication 135 to be implemented between the network environments without hardware support. In some implementations, using these protocols may avoid the need to make changes to the RC or UD semantics in the application, middleware, or the connection protocol level.

In some implementations, loose coupling of BQPs and CQPs to applications with connection controllers and intervention for configuration can allow for dynamical allocation and free CQP and BQP resources to different applications. For example, resources can be allocated within a PCIe function and across functions through the connection controllers. For example, the number of BQPs and CQPs per network environment may be grown or shrunk dynamically depending on application use of the resources. In another example, a given number of BQPs may be multiplexed over different applications within a PCIe function. In another example, a pool of BQPs may be multiplexed over all active PCIe functions.

According to various implementations, all or a portion of the network environments in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of the network environments can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of the application 110A and the application 110B in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multitenant application for each customer such that one customer cannot access data and/or configuration information of another customer.

In some examples, all or a portion of the applications in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

As illustrated in FIG. 1, system 100 can also include the memory 115A and the memory 115B. Memory generally can represent any type or form of volatile or non-volatile storage device or medium capable of storing data and/or computer-readable instructions. In one example, memory can store, load, and/or maintain the one or more controllers. Examples of memory include, without limitation, Random Access Memory (RAM), Read Only Memory (ROM), flash memory, caches, variations or combinations of one or more of the same, or any other suitable storage memory.

In some implementations, the connection controller 120A and the connection controller 120B of FIG. 1 can each be a chip, such as an integrated circuit, system on a chip (SoC), or other chip. In some cases, the chip can be a processing unit, such as a data processing unit (DPU), central processing unit (CPU), or graphics processing unit (GPU). In some implementations, the connection controller 120A and the connection controller 120B can perform one or more tasks, such as in response to instructions to be executed by the controllers. In some implementations, the connection controller 120A can initiate the RDMA communication 135. In some implementations, the connection controller 120A can maintain or disconnect the RDMA communication 135.

Figure 3:
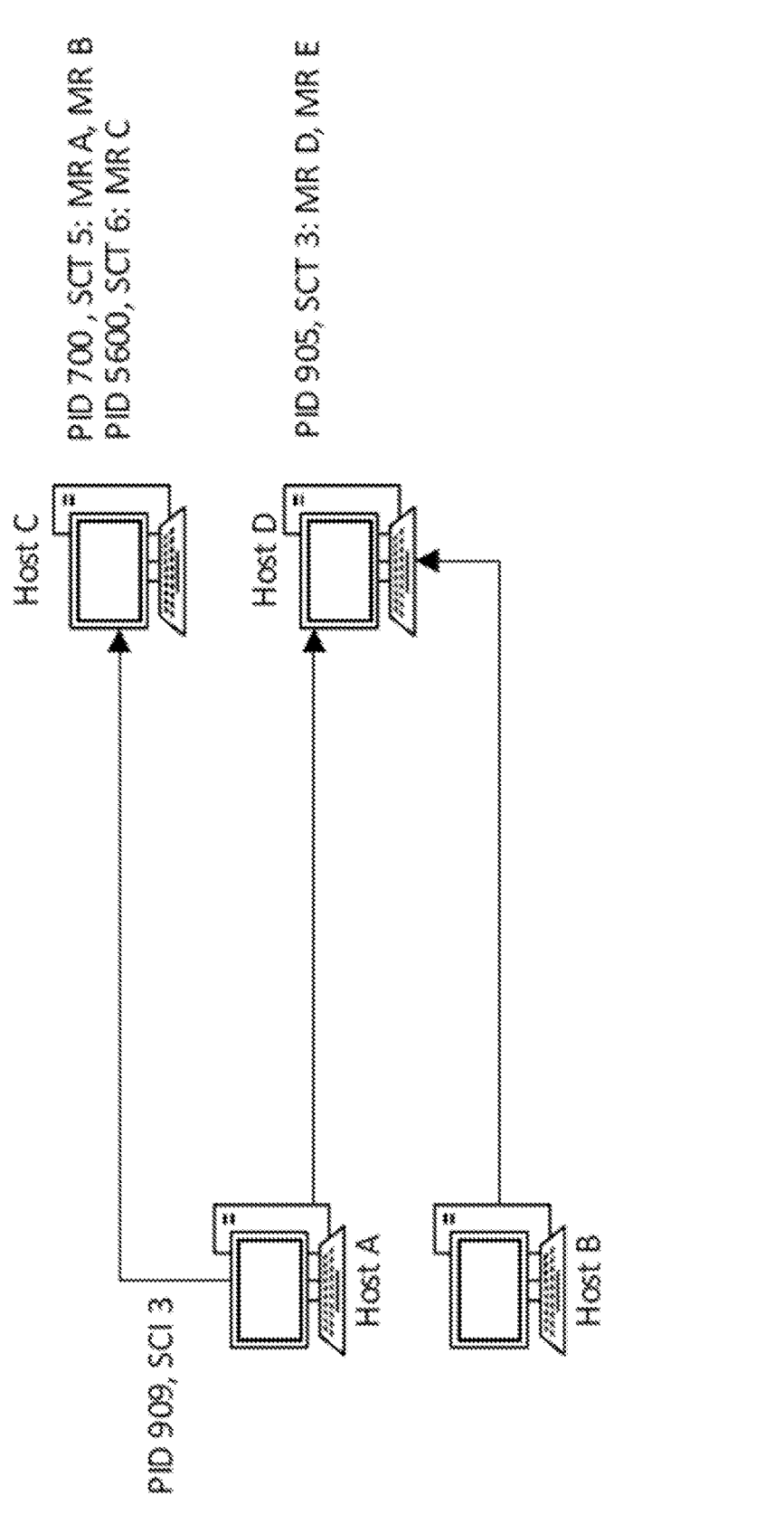
FIG. 3 is a block diagram of another example system for scalable communications among hardware components.
Figure 4:
FIG. 4 is a block diagram of a computer system with which some implementations can operate.
Figure 4:
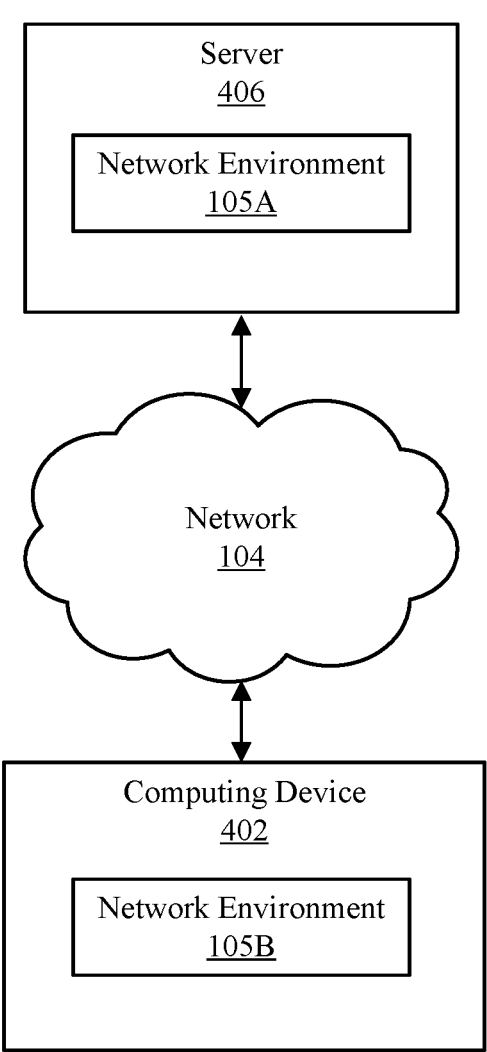

In certain implementations, the connection controller 120A and the connection controller 120B can be components of one or more computing devices, such as the devices illustrated in FIG. 4 (e.g., computing device 402 and/or server 406). For example, the computing device 402 can include the connection controller 120A and/or the server 406 can include the connection controller 120B. The system 400 in FIG. 3 can represent all or portions of one or more special-purpose computers configured to perform one or more tasks.

As illustrated in FIG. 1, the connection controllers can be or include one or more circuits. While each illustrated as a single circuit, those skilled in the art will appreciate that connection controllers may each be implemented as one or more circuits. In addition, as will be discussed in further detail below, some implementations may include a sequence of circuits that includes one or more circuits interleaved with one or more circuits. In some such cases, the circuits can be configured differently from one another. For example, the connection controller 120A can generate requests 125A-N to allocate resources for the RDMA communication 135. In some implementations, the connection controller 120A can transmits responses 130A-N maintain or disconnect the RDMA communication 135.

Circuits can represent any type or form of hardware-implemented processing unit capable of interpreting and/or executing computer-readable instructions. In one example, the one or more circuits can access and/or modify one or more bits of the one or more portions of the responses 130A-N of the system 100. In one example, the one or more circuits can access and/or modify the memory of the system 100. Additionally, or alternatively, the one or more circuits can control one or more of components of the system 100. Examples of the one or more circuits include, without limitation, cores, logic units, microprocessors, microcontrollers, Field-Programmable Gate Arrays (FPGAs) that implement softcore processors, Application-Specific Integrated Circuits (ASICs), portions of one or more of the same, variations or combinations of one or more of the same, or any other suitable physical processor.

The connection controllers can be data circuits, which can facilitate the transmissions of the messages among various circuits. Examples of the data circuits include, without limitation, cores, logic units, microprocessors, microcontrollers, Field-Programmable Gate Arrays (FPGAs) that implement softcore processors, Application-Specific Integrated Circuits (ASICs), portions of one or more of the same, variations or combinations of one or more of the same, or any other suitable physical processor.

In some implementations, the requests 125A-N can include information that identifies the application 110B and the memory 115B to which the RDMA communication 135 is to be established. For example, the information can include metadata, a MAC address, and/or a destination IP that identifies the application 110B. Examples of requests 125A-N include RDMA requests such as read, write, send, and atomic.

Responses 130A-N can include any number of commands, packets, or computer-readable instructions. Examples of the content included in the requests and responses include network data, payloads, addresses, definitions, headers, protocols, identifiers, checksum values, hashes or any other instructions received from a Network on Chip (NoC), Network Interface Controller (NIC), user logic, or fabric adapter. The messages can be configured to be transmitted among devices, data circuits, or other entities.

In some implementations, the requests 125A-N or responses 130A-N are erroneous such as ghost, duplicate, and/or stale packets. Ghost packets can be requests 125A-N or responses 130A-N that are delayed so that by the time they are received by the connection controllers, the packets are no longer associated with an RDMA communication 135. For example, ghost packets can be packets where the original packet is delayed in the network enough that it is received by the connection controller 120B (e.g., receiver) after a retransmitted copy of the original packet. A duplicate packet can be the retransmitted copy of the original packet that it is inadvertently sent by the connection controller 120A and received by the connection controller 120B. Stale packets can be packets in flight while the RDMA communication 135 is recycled to connect to a new or the current endpoint. The RDMA communication 135 can be recycled between the network environments to provide protection against erroneously accepting and processing stale and ghost packets.

In some implementations, the requests 125A-N and the responses 130A-N can be identified by an identifier (e.g., Generation Identifier (GENID)). The identifier can be an integer incremented for each of the requests 125A-N and the responses 130A-N. The identifier can be maintained per connection controller, RDMA communications, or across all connection controllers for a function. The identifier can be wide enough that connection controllers can detect ghost packets as further described below. The connection controllers can track connections by using the identifier. The responses 130A-N can be matched to requests 125A-N by using the identifier. For example, by using the identifier, responses 130A-N can be matched to requests 125A-N to connect the RDMA communication 135. In another example, by using identifier, responses 130A-N can be matched to requests 125A-N to disconnect the RDMA communication 135.

RDMA communication 135 can be a direct memory access from the memory 115A of application 110A into the memory 115B of the application 110B. For example, the RDMA communication 135 can occur without involving an operating system. In some implementations, the RDMA communication 135 can be unidirectional from the application 110A to the memory 115B of the application 110B. The connection controller 120A can allocate resources for maintaining the RDMA communication 135. The resources can be computing resources for establishing RDMA between the applications. In some implementations, the connection controller 120A transmits the requests 125A-N to connect via the RDMA communication 135.

In some implementations, the RDMA communication 135 can include an RDMA queue pair (QP). For example, the RDMA communication 135 can be a high-throughput, low-latency network connection, which can be useful in massively parallel computer clusters. In some implementations, the RDMA communication 135 can include a queue pair utilized for scalable transport. In some implementations, the application 110A can be connected to multiple other applications on the same or different network environments concurrently. In some implementations, the application 110B and the memory 115B can be connected and/or accessed by multiple applications on the same or different network environments concurrently.

Figure 2:
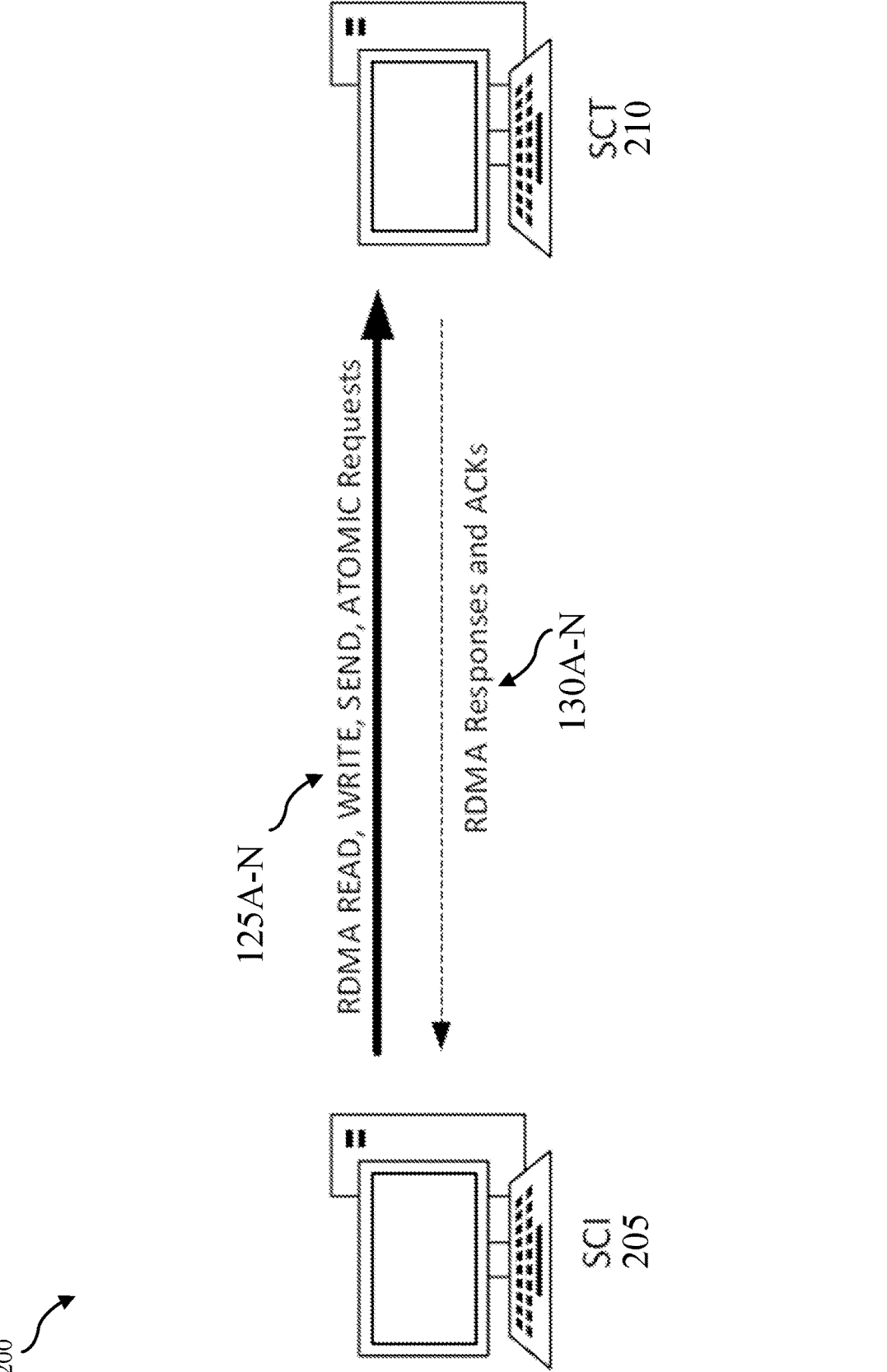
FIG. 2 is a block diagram of another example system for scalable communications using hardware components.

FIG. 2 illustrates another example system 200 with which some implementations can operate. Similar elements are labeled with corresponding numbers and labels from FIG. 1. Some functionality of elements shown in FIG. 2 is also described below in connection with FIGS. 5-6.

The SCI 205 can initiate requests 125A-N with the SCT 210, which can respond with responses 130A-N. The SCI 205 can be similar to the network environment 105A and the connection controller 120A. As shown in FIG. 2, examples of requests 125A-N include RDMA requests such as read, write, send, and atomic. The SCT 210 can be similar to the network environment 105B and the connection controller 120B. As shown in FIG. 2, examples of responses 130A-N include RDMA responses and acknowledgements (ACKs). The SCI 205 and the SCT 210 can establish the RDMA communication 135 to communicate.

FIG. 3 illustrates another example system 300 with which some implementations can operate. Similar elements are labeled with corresponding numbers and labels from FIG. 1. Some functionality of elements shown in FIG. 3 is also described below in connection with FIGS. 5-6.

FIG. 3 illustrates another example system 300 for scalable communications among hardware components. For example, the system 300 includes four hosts to illustrate the flexibility of the network environments to establish RDMA communications among different network environments. Each of the hosts can be similar to the network environment 105A and/or network environment 105B. Some functionality of elements shown in FIG. 3 is also described below in connection with FIGS. 5-6.

As shown in FIG. 3, process ID (PID) 700 on Host C can allocate SCT 5 through which memory registers (MRs) A and B may be accessed. PID-5600 on Host C can allocate SCT 6 through which MR C may be accessed. PID-905 on Host D can allocate SCT 3 through which MR D and E may be accessed. PID-909 on Host A can allocate SCI 3. PID-444 on Host B can allocate SCI 4. PID-909 on Host A can have connection keys for SCTs 5 and 6 on Host C and SCT 3 on Host D. Through RDMA operations submitted to SCI 3, PID-909 can access MRs A, B and C on Host C and MRs D and E on Host D. PID-444 on Host B can have the connection keys for SCT 3 on Host D, so PID-444 can access MRs D and E on Host D through RDMA requests submitted to SCI 4. PID-905 on Host D can support concurrent access to MRs D and E from Host A and Host B through SCT 3. In some implementations, there is no transport or operation level mutual exclusion support defined for concurrent access to the same MRs through different hosts.

Example system 100 in FIG. 1, system 200 in FIG. 2, and/or system 300 in FIG. 3 can be implemented in a variety of systems. For example, all or a portion of system 100, system 200 in FIG. 2, and/or system 300 can represent portions of system 400 in FIG. 4. As shown in FIG. 4, system 400 can include a computing device 402 in communication with a server 406 via the network 104. In one example, all or a portion of the functionality of system 100 can be performed by the computing device 402, server 406, and/or any other suitable computing system. As will be described in greater detail below, one or more components from FIG. 1 can, when executed by at least one processor of computing device 402 and/or server 406, enable computing device 402 and/or server 406 for scalable communications.

Computing device 402 generally represents any type or form of computing device capable of reading computer-executable instructions. For example, the computing device 402 can be an integrated circuit or a network interface controller (NIC). Additional examples of computing device 402 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 406 generally represents any type or form of computing device that is capable of reading computer-executable instructions. For example, the server 406 can include circuits or network interfaces. In one example, the network 104 can facilitate communication between computing device 402 and server 406. In this example, network 104 can facilitate communication or data transfer using wireless and/or wired connections. Additional examples of server 406 include, without limitation, storage servers, database servers, application servers, and/or web servers configured to run certain software applications and/or provide various storage, database, and/or web services. Although illustrated as a single entity in FIG. 4, server 406 can include and/or represent a plurality of servers that work and/or operate in conjunction with one another.

Many other devices or subsystems can be connected to system 100 in FIG. 1 system 200 in FIG. 2, and/or system 300. Conversely, all of the components and devices illustrated in FIG. 1-3 need not be present to practice the implementations described and/or illustrated herein. The devices and subsystems referenced above can also be interconnected in different ways from that shown in FIGS. 1-3. System 100, system 200, and/or system 300 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, non-transitory medium, non-transitory computer-readable, or medium capable of storing or carrying computer-readable instructions. Examples of computer-readable media or non-transitory computer-readable include, without limitation, transmission-type media, such as carrier waves, and non-transitory type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other non-transitory or distribution systems.

Figure 5:
FIG. 5 is a flow diagram of an example method for initiating scalable communications.

FIG. 5 is a flow diagram of an example computer-implemented method 500 for initiating scalable communications. The steps shown in FIG. 5 can be performed by any suitable circuit, computer-executable code and/or computing system, including system 100 in FIG. 1, system 200 in FIG. 2, system 300 in FIG. 3, system 400 in FIG. 4, and/or variations or combinations of one or more of the same. In one example, each of the steps shown in FIG. 5 can represent a circuit or algorithm whose structure includes and/or is represented by multiple sub-steps, examples of which will be provided in greater detail below.

As illustrated in FIG. 5, at step 502, one or more of the systems described herein can receive requests 125A-N from an application to communicate with a destination. For example, as part of step 502, the connection controller 120A can, as part of system 100 in FIG. 1, receive the requests 125A-N from the application 110A. The systems described herein can perform step 502 in a variety of ways.

In one example, the connection controller 120A can receive the requests 125A-N from the application 110A to communicate with the application 110B. In some implementations, the connection controller 120A can be configured to receive requests 125A-N from the application 110A to communicate with the application 110B over the network 104. In some implementations, the requests 125A-N can be to initiate the RDMA communication 135. For example, the requests 125A-N can include data for establishing the RDMA communication 135 between the application 110A and the application 110B. In some implementations, the requests 125A-N are to communicate data to the application 110B using RDMA communication 135. For example, the requests 125A-N can include RDMA requests such as read, write, send, and atomic.

In a case that a request is a request to communicate data using RDMA communication 135, the request may identify a destination to which the data is to be communicated and may further include the data to be communicated. In these implementations, such a request to communicate data may differentiate other approaches to RDMA that may include destination-identifying information in a request to establish RDMA communication and include data to be communicated in a separate message that merely instructs using the existing communication (already established to a destination) to send data.

As illustrated in FIG. 5, at step 504, one or more of the systems described herein can identify information about the destination from the requests 125A-N. For example, as part of step 504, the connection controller 120A can, as part of system 100 in FIG. 1, identify information about the application 110B from the requests 125A-N. The systems described herein can perform step 504 in a variety of ways.

In some implementations, the connection controller 120A can identify data to be communicated from the application 110A to the application 110B. In some implementations, the requests 125A-N includes data to be communicated from the application 110A to the application 110B and the information indicating the application 110B. In some implementations, the connection controller 120A can be configured to identify and/or indicate the application 110B from information included in the requests 125A-N. In one example, the connection controller 120A can identify metadata, a MAC address, and/or a destination IP associated with the application 110B. For example, access by the application 110A to the memory 115B of the application 110B can be determined by an application-specific key provided to the hardware as part of requests 125A-N. This key can be used to authenticate the application 110A and the application 110B during setup and teardown of the RDMA communication 135.

As illustrated in FIG. 5, at step 506, one or more of the systems described herein can identify whether resources are allocated for communicating with the destination. In some implementations, the resources are for maintaining at least one queue of an RDMA queue pair for communicating with the application 110B. For example, as part of step 506, the connection controller 120A can, as part of system 100 in FIG. 1, identify whether resources are allocated for communicating with the application 110B. The systems described herein can perform step 506 in a variety of ways.

The connection controller 120A can identify whether resources are allocated for an existing connection between the application 110A and the application 110B. In some implementations, the connection controller 120A can determine if the resources are allocated based on whether the information identifying the application 110B matches an existing RDMA communication with the application 110B.

In some implementations, the computer-implemented method 500 proceeds to step 508 if the connection controller 120A identifies that resources are not allocated for communicating with the application 110B. In some implementations, if the information identifying the application 110B does not match an existing RDMA communication, then the resources are not yet allocated. For example, the resources are not yet allocated, the connection controller 120A can forward the BQP identification and complete all outstanding requests via the existing connections (e.g., with the other connection controllers and network environments) and then disconnect the RDMA communication 135 (e.g., BQP SQ). In a case that resources have not been allocated to the application 110, the connection controller 120A can be configured to allocate the resources to communicate the data to the application 110B.

In some implementations, the computer-implemented method 500 proceeds to step 510 if the connection controller 120A identifies that resources are allocated for communicating with the application 110B. In a case that resources have been allocated to the application 110B, the connection controller 120A can be configured to communicate the data to the application 110B over the network 104 using the resources that have been allocated. In some implementations, if the information identifying the application 110B matches an existing RDMA communication, then the resources are already allocated.

As illustrated in FIG. 5, at step 508, one or more of the systems described herein can reallocate resources for communicating with the destination. For example, in some implementations in which connection management is done with hardware acceleration using hardware components, as part of step 508, the connection controller 120A (which can be implemented as a circuit/chip in some implementations) can, as part of system 100 in FIG. 1, reallocate the resources to communicate with the application 110B. The systems described herein can perform step 508 in a variety of ways.

In some implementations, the connection controller 120A can allocate resources for establishing communications for the application 110A to access the memory 115B of the application 110B. In some implementations, the connection controller 120A can allocate resources for establishing the RDMA communication 135 between the application 110A and the application 110B. In some implementations, the connection controller 120A can reallocate the resources to establish the RDMA communication 135 between the application 110A and the application 110B.

In some implementations, the connection controller 120A can be configured to reallocate an RDMA queue pair that was, prior to reallocating, allocated to communicating via RDMA with a different application. In one example, the connection controller 120A can reallocate the resources from a different connection to the connection between the application 110A and the application 110B. In some implementations, prior to allocating the resources to communicate the data to the application 110B, the connection controller 120A can be configured to disconnect RDMA with the different application. In some implementations, the connection controller 120A can disconnect a different RDMA communication between the application 110A and the memory of a different application to make resources available for other connections instead of having the resources allocated to idle connections. For example, the connection controller 120A can disconnect the RDMA communication to reuse the resources for the RDMA communication 135 to connect to the network environment 105B. In some implementations, the computer-implemented method 500 proceeds to step 510 after reallocating the resources for communicating with the application 110B.

As illustrated in FIG. 5, at step 510, one or more of the systems described herein can use the allocated resources to communicate with the destination. For example, as part of step 510, the connection controller 120A can, as part of system 100 in FIG. 1, use the allocated resources to communicate with the application 110B. The systems described herein can perform step 510 in a variety of ways.

The connection controller 120A can be configured to communicate the data to the application 110B over the network 104 using the resources that have been allocated. In one example, the connection controller 120A can use the resources to establish the RDMA communication 135 between the application 110A and the application 110B. In some implementations, the application 110A can cause the connection controller 120A to transmit the requests 125A-N (e.g., write requests) to initiate the RDMA communication 135 (e.g., a scalable connection (SC)) to the memory 115B of the application 110B (e.g., remote peers).

In some implementations, the connection controller 120A can initiate the RDMA communication 135 for the application 110A to access the memory 115B of the application 110B. For example, the connection controller 120A can create and maintain the RDMA communication 135 between the application 110A and the memory 115B of the application 110B when the resources are allocated. The RDMA communication 135 can be a unidirectional flow from the network environment 105A to the network environment 105A. The connection controller 120A can issue the requests 125A-N (e.g., RDMA requests) to the connection controller 120B, which can generate responses 130A-N.

In some implementations, the connection controller 120A can include a timer. In some implementations, the connection controller 120A can disconnect any existing RDMA communication between the application 110A and the memory of any application to make resources available for other connections instead of having the resources allocated to idle connections. For example, the connection controller 120A can disconnect the RDMA communication after the connection controller 120A does not transmit requests 125A-N before the timer of the connection controller 120A expires. Conversely, if the additional requests 125A-N are transmitted, the connection controller 120A can reset the timer. In some implementations, the connection controller 120A can disconnect the RDMA communication without notifying the connection controller 120B. In some implementations, the connection controller 120A can disconnect the RDMA communication and then notify the connection controller 120B by transmitting a disconnection indicator.

In some implementations, the connection controller 120A maintains a timer for tracking whether the responses 130A-N are received within a timeout period. If the responses 130A-N to the requests 125A-N are not received within the timeout period, then the connection controller 120A can transmit requests 125A-N to cancel or disconnect the RDMA communication 135. For example, the connection controller 120A can transmit the requests 125A-N to the connection controller 120B to cancel or disconnect the RDMA communication 135.

The connection controller 120A can track the requests 125A-N and the responses 130A-N to determine whether to maintain or disconnect the RDMA communication 135. In some implementations, the connection controller 120A can identify whether to maintain or disconnect the RDMA communication 135 based on the information in the requests 125A-N and the responses 130A-N. For example, the connection controller 120A can use the information of the requests 125A-N and responses 130A-N to determine whether the requests 125A-N and/or responses 130A-N are erroneous. In some implementations, the requests 125A-N and responses 130A-N can be ghost packets, which can be requests 125A-N or responses 130A-N that are delayed so that by the time they are received by the connection controllers, the packets are no longer associated with an RDMA communication 135. For example, ghost packets can be packets where the original packet is delayed in the network enough that it is received by the connection controller 120B (e.g., receiver) after a retransmitted copy of the original packet.

In some implementations, the connection controller 120A can compare the responses 130A-N to the requests 125A-N to detect errors. For example, the connection controller 120A can compare the information in the responses 130A-N to the information in the requests 125A-N. In some implementations, the connection controller 120A can compare the identifier of the requests 125A-N to the identifier of responses 130A-N. In some implementations, if the connection controller 120A determines that the information in the responses 130A-N matches the information in the requests 125A-N, the connection controller 120A can determine to maintain the RDMA communication 135. In some implementations, if the connection controller 120A determines that the information in the responses 130A-N does not match the information in the requests 125A-N, the connection controller 120A can determine to disconnect the RDMA communication 135.

In some implementations, the information in the requests 125A-N can identify the requests 125A-N, the application 110A, the application 110B, the connection controller 120A, and/or the connection controller 120B. In some implementations, the connection controller 120A can identify, from the requests 125A-N, an identifier of the requests 125A-N. In some implementations, the connection controller 120A can identify, from the requests 125A-N, the application 110A from which the RDMA communication 135 is to be established. In some implementations, the connection controller 120A can identify, from the requests 125A-N, the application 110B to which the RDMA communication 135 is to be established. In some implementations, the connection controller 120A can identify, from the requests 125A-N, the connection controller 120A. In some implementations, the connection controller 120A can identify, from the requests 125A-N, the connection controller 120B.

The connection controller 120A can receive the responses 130A-N from the connection controller 120B responsive to transmitting the requests 125A-N. In some implementations, the information in the responses 130A-N can identify the requests 125A-N, the application 110A, the application 110B, the connection controller 120A, and/or the connection controller 120B. In some implementations, the connection controller 120A can identify, from the responses 130A-N, an identifier of the requests 125A-N. In some implementations, the connection controller 120A can identify, from the responses 130A-N, an identifier of the responses 130A-N. In some implementations, the connection controller 120A can identify, from the responses 130A-N, the application 110A from which the RDMA communication 135 is established. In some implementations, the connection controller 120A can identify, from the responses 130A-N, the application 110B with which the RDMA communication 135 is established. In some implementations, the connection controller 120A can identify, from the responses 130A-N, the connection controller 120A. In some implementations, the connection controller 120A can identify, from the responses 130A-N, the connection controller 120B.

In some implementations, the connection controllers can set identifiers of the packets of the requests 125A-N and the responses 130A-N. In some implementations, the connection controller 120A can set or define the identifiers of the requests 125A-N. For example, the connection controller 120A can set the packet sequence number (e.g., sci_bqp-_sq_psn) as at least one more (e.g., modulo $2^{24}$) than the current packet sequence number (e.g., QP sq_psn). In some implementations, the connection controller 120A can set or define the identifiers of the requests 125A. In some implementations, the connection controller 120B (e.g., target of the RDMA communication 135) can increase the size of the valid duplicate region (e.g., from 0 to a constant such as a maximum duplicate window size) as the requests 125A-N are received from the connection controller 120A. For example, the region can be increased by the number of expected response packets for an RDMA READ request. In another example, the region can be increased by one for other RDMA requests.

In some implementations, the connection controller 120A can determine whether to maintain or disconnect the RDMA communication 135 based on whether the identifier of the responses 130A-N matches the identifier of the requests 125A-N. In some implementations, the connection controller 120A can maintain a tracking table of identifiers of the requests 125A-N and query the identifier of the responses 130A-N to determine whether the identifier of the request 125A-N matches the identifier of responses 130A-N.

In some implementations, if the connection controller 120A determines that the identifier of the responses 130A-N matches the identifier of the requests 125A-N, the connection controller 120A can determine to maintain the RDMA communication 135. For example, the identifier of the responses 130A-N generated in response to requests 125A-N that are genuine will match the requests 125A-N that are pending or outstanding, so the connection controller 120A can maintain and/or establish the RDMA communication 135.

In some implementations, if the identifier of the responses 130A-N does not match the identifier of the requests 125A-N, the connection controller 120A can discard the responses 130A-N without establishing the RDMA communication 135. In some implementations, if the connection controller 120A determines that the identifier of the responses 130A-N does not match the identifier of the requests 125A-N, the connection controller 120A can determine to disconnect the RDMA communication 135. For example, the identifier of the responses 130A-N generated in response to requests 125A-N that are ghost packets will not match any requests 125A-N that are pending or outstanding, so the connection controller 120A can discard those responses 130A-N and/or disconnect the RDMA communication 135.

Figure 6:
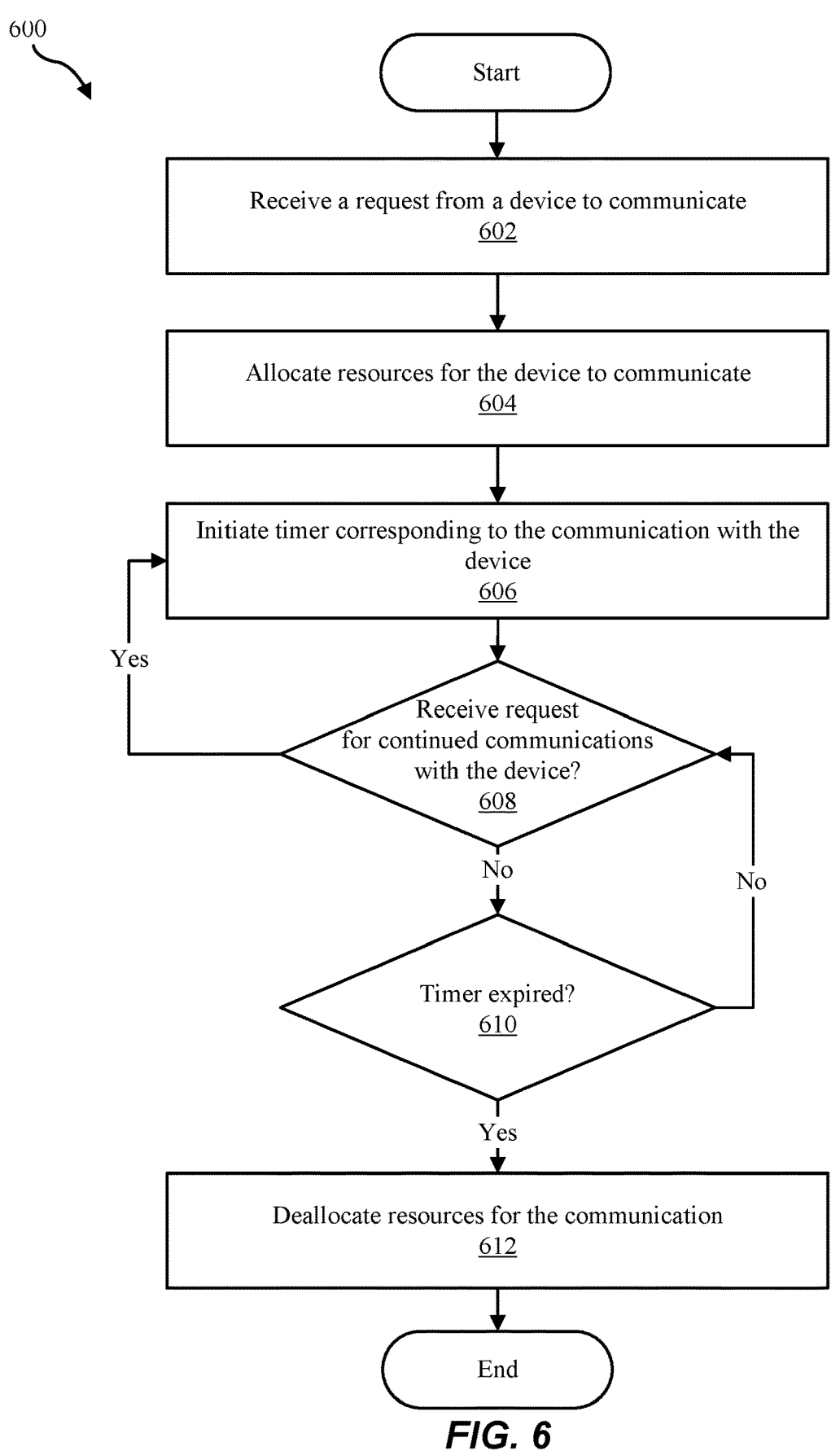
FIG. 6 is a flow diagram of an example method for maintaining scalable communications.

FIG. 6 is a flow diagram of an example computer-implemented method 600 for maintaining scalable communications. The steps shown in FIG. 6 can be performed by any suitable circuit, computer-executable code, and/or computing system, including system 100 in FIG. 1, system 200 in FIG. 2, system 300 in FIG. 3, system 400 in FIG. 4, and/or variations or combinations of one or more of the same. In one example, each of the steps shown in FIG. 6 can represent a circuit or algorithm whose structure includes and/or is represented by multiple sub-steps, examples of which will be provided in greater detail below.

As illustrated in FIG. 6, at step 602, one or more of the systems described herein can receive a request from a device to communicate. For example, as part of step 602, the connection controller 120B can, as part of system 100 in FIG. 1, receive requests 125A-N from the connection controller 120A. The systems described herein can perform step 602 in a variety of ways.

In one example, the connection controller 120B can receive the requests 125A-N from the connection controller 120A to access the memory 115B of the application 110B. In some implementations, the requests 125A-N can be to initiate the RDMA communication 135. For example, the requests 125A-N can include RDMA requests such as read, write, send, and atomic. In some implementations, the connection controller 120B can identify information about the connection controller 120A in the requests 125A-N. In some implementations, the connection controller 120B can identify the identifier of the connection controller 120B in the requests 125A-N. The connection controller 120A can store the identifier and any other metadata associated with the requests 125A-N to establish the RDMA communication 135.

As illustrated in FIG. 6, at step 604, one or more of the systems described herein can allocate resources to communicate with the destination. For example, as part of step 604, the connection controller 120B can, as part of system 100 in FIG. 1, allocate resources to communicate with the application 110A. The systems described herein can perform step 604 in a variety of ways.

In some implementations, the connection controller 120B can allocate the resources to establish the RDMA communication 135 between the application 110A and the application 110B. In some implementations, the connection controller 120B can be configured to allocate the resources for the application 110B to receive data via RDMA communication 135 from the application 110A that is sending data over the network 104. In some implementations, the connection controller 120B can be configured to maintain an RDMA queue pair communication with the application 110A over the network 104.

In some implementations, the connection controller 120B can transmit responses 130A-N to establish the RDMA communication 135 for the application 110A to access the memory 115B of the application 110B. Examples of responses 130A-N include RDMA responses and acknowledgements (ACKs). In another example, the connection controller 120B can include its identifier in the responses 130A-N for the connection controller 120A to perform the comparison as described above. Such hardware and firmware-based handling of connections and disconnections based on requests 125A-N and responses 130A-N can enable high-performance (e.g., millions, tens of millions, or hundreds of millions of connections/sec) initialization and disconnection of RDMA communication 135.

As illustrated in FIG. 6, at step 606, one or more of the systems described herein can initiate a timer corresponding to the communication (e.g., memory access) with the device. For example, as part of step 606, the connection controller 120B can, as part of system 100 in FIG. 1, initiate a timer corresponding to the application 110A accessing the memory 115B of the application 110B. The systems described herein can perform step 606 in a variety of ways.

In some implementations, the connection controller 120B can initiate a timer corresponding to receipt of data via the RDMA from the application 110A over the network 104. In one example, the timer represents the number of seconds during which the application 110A and the application 110B are communicating. In some implementations, the connection controller 120B can initiate the timer to track the time during which the RDMA communication 135 occurs between the application 110A and the application 110B.

As illustrated in FIG. 6, at step 608, one or more of the systems described herein can receive a request for continued communications with the device. For example, as part of step 608, the connection controller 120B can, as part of system 100 in FIG. 1, receive requests 125A-N from the connection controller 120A for to maintain the RDMA communication 135 for continued access to the memory 115B of the application 110B by the application 110A. The systems described herein can perform step 608 in a variety of ways.

In one example, the connection controller 120B can receive the requests 125A-N from the connection controller 120A. In some implementations, if the requests 125A-N for continued access is received, the computer-implemented method 600 proceeds to step 608 to reset the timer. In some implementations, if the requests 125A-N for continued access are not received, the computer-implemented method 600 proceeds to step 610 to determine if the timer is expired.

As illustrated in FIG. 6, at step 610, one or more of the systems described herein can determine whether the timer is expired. For example, as part of step 610, the connection controller 120B can, as part of system 100 in FIG. 1, determine whether the timer corresponding to the communication between the application 110B and the application 110A has expired. The systems described herein can perform step 610 in a variety of ways.

In one example, the connection controller 120B can use the timer to determine if the RDMA communication 135 is live or idle. The timer can correspond to receipt of data via the RDMA communication 135 from the network environment 105A over the network 104. In some implementations, the connection controller 120B can determine whether the timer corresponding to the RDMA communication 135 between the application 110A and the memory 115B of the application 110B has expired. For example, the timer can represent a timeout period for the RDMA communication 135. In some implementations, the connection controller 120B can be configured with the timeout period. For example, the timeout can be user provided. The connection controller 120B can maintain the timer to disconnect any RDMA communication 135 and/or queue pair that has not received traffic for the timeout period. Disconnecting after the timeout period can be used to avoid wasting network resources on connections that are idle if a disconnect request from the other network (e.g., network environment 105A) was dropped.

In some implementations, if the timer is not expired, the computer-implemented method 600 proceeds to step 608 to determine if a request for continued access to the device is received. In some implementations, the connection controller 120B can be configured to reset the timer responsive to receiving data via the RDMA communication 135 from the application 110A over the network 104. In some implementations, the connection controller 120B can be configured to reset the timer responsive to receiving requests 125A-N from the connection controller 120A.

In some implementations, if the timer has expired, the computer-implemented method 600 proceeds to step 612 to deallocate resources for the communication. In some implementations, in response to expiration of the timer, the connection controller 120B can deallocate the resources for receiving data via the RDMA communication 135 from the application 110A over the network 104.

As illustrated in FIG. 6, at step 612, one or more of the systems described herein can deallocate the resources from the access to the memory. For example, as part of step 612, the connection controller 120B can, as part of system 100 in FIG. 1, determine to deallocate resources from the communication between the application 110B and the application 110A. The systems described herein can perform step 612 in a variety of ways.

In some implementations, the connection controller 120B can deallocate the resources by disconnecting the RDMA communication with the application 110A via the network 104. In one example, the connection controller 120B can disconnect the RDMA communication 135 between the application 110A and the memory 115B of the application 110B. In another example, the RDMA communication 135 can be disconnected to disconnect the application 110A from the memory 115B of the application 110B.

In some implementations, the connection controller 120B can disconnect the RDMA communication 135 without notifying the connection controller 120A. In some implementations, the connection controller 120B can disconnect the RDMA communication and then notify the connection controller 120A by transmitting a disconnection indicator.

In some implementations, the connection controller 120B can explicitly or implicitly disconnect the RDMA communication 135. The connection controller 120B can implicitly disconnect the RDMA communication 135 when the timer expires. In some implementations, the connection controller 120B can disconnect the RDMA communication 135 between the application 110A and the memory 115B of the application 110B to make resources available for other connections instead of having the resources allocated to idle connections. For example, the connection controller 120B can implicitly disconnect the RDMA when it is idle because the timer expired after timeout the period. In another example, the connection controller 120B can disconnect the RDMA communication 135 when additional requests 125A-N are not received by the connection controller 120B before its timer expires. Conversely, if the additional requests 125A-N are received, the connection controller 120B can reset the timer.

The connection controller 120B can explicitly disconnect the RDMA communication 135 by reallocating the resources among the applications. In some implementations, the connection controller 120B receives requests 125A-N to disconnect the RDMA communication 135. For example, the connection controller 120B can explicitly disconnect the RDMA communication 135 in response to receiving requests 125A-N to disconnect the RDMA communication 135. In some implementations, the connection controller 120B can reallocate the RDMA communication 135 by disconnecting from one network environment to connect to another network environment.

The connection controller 120B can analyze the requests 125A-N to disconnect the RDMA communications to determine whether to disconnect or maintain the RDMA communication 135. In some implementations, the connection controller 120B can identify whether to maintain or disconnect the RDMA communication 135 based on the information in the requests 125A-N to disconnect. For example, the connection controller 120N can use the information of the requests 125A-N to determine whether the requests 125A-N and/or the responses 130A-N are erroneous. In some implementations, the requests 125A-N can be ghost packets, which can be requests 125A-N that are delayed so that by the time they are received by the connection controller 120B, the packets are no longer associated with an RDMA communication 135. For example, ghost packets can be packets where the original packet is delayed in the network enough that it is received by the connection controller 120B (e.g., receiver) after a retransmitted copy of the original packet.

In some implementations, the connection controller 120B can compare the requests 125A-N to the RDMA communications determine whether the requests 125A-N are erroneous. For example, the connection controller 120B can compare the information of the RDMA communications to the information in the requests 125A-N. In some implementations, the connection controller 120B can compare the identifier of the requests 125A-N to the identifiers the RDMA communications. In some implementations, if the connection controller 120B determines that the information in the requests 125A-N matches the information in the RDMA communication, the connection controller 120B can determine to disconnect the RDMA communication 135. In some implementations, if the connection controller 120B determines that the information in the RDMA communications does not match the information in the requests 125A-N to disconnect, the connection controller 120B can determine to ignore and/or drop the requests 125A-N to disconnect.

In some implementations, the information in the requests 125A-N can identify the requests 125A-N, the application 110A, the application 110B, the connection controller 120B, and/or the connection controller 120B. In some implementations, the connection controller 120B can identify, from the requests 125A-N, an identifier of the requests 125A-N. In some implementations, the connection controller 120B can identify, from the requests 125A-N, the application 110A from which the RDMA communication 135 is to be disconnected. In some implementations, the connection controller 120B can identify, from the requests 125A-N, the application 110B to which the RDMA communication 135 is to be disconnected. In some implementations, the connection controller 120B can identify, from the requests 125A-N, the connection controller 120B. In some implementations, the connection controller 120B can identify, from the requests 125A-N, the RDMA communication 135 to be disconnected.

In some implementations, the connection controller 120B can determine whether to maintain or disconnect the RDMA communication 135 based on whether the identifier of the RDMA communications match the identifier of the requests 125A-N. In some implementations, the connection controller 120B can maintain a tracking table of identifiers of the RDMA communications and query the identifiers of the requests 125A-N to determine whether the identifier of the request 125A-N matches the identifier of any of the RDMA communications.

In some implementations, the connection controller 120B can disconnect the RDMA communication 135 if the identifier of the requests 125A-N matches the identifier stored by the connection controller 120B for the RDMA communication 135. For example, the identifier can be matched in a tracking table. In some implementations, if the connection controller 120B determines that the identifier of the RDMA communication 135 matches the identifier of the requests 125A-N, the connection controller 120B can determine to disconnect the RDMA communication 135. For example, the identifier of the requests 125A-N that are genuine will match the identifier of the RDMA communication 135 that is active, so the connection controller 120B can disconnect the RDMA communication 135.

In some implementations, if the identifier in the requests 125A-N to disconnect does not match the identifier of the stored identifiers of pending RDMA communications, the connection controller 120B can discard the requests 125A-N to disconnect without disconnecting the RDMA communication 135. In some implementations, if the identifier of the RDMA communication 135 does not match the identifier of the requests 125A-N, the connection controller 120A can discard, drop, and/or delete the requests 125A-N without disconnecting the RDMA communication 135. In some implementations, if the connection controller 120B determines that the identifier of the RDMA communication 135 does not match the identifier of the requests 125A-N, the connection controller 120A can determine to maintain the RDMA communication 135. For example, the identifier of the requests 125A-N that received after a delay will not match any RDMA communications that are pending or outstanding, so the connection controller 120A can discard those requests 125A-N without disconnecting the RDMA communication 135.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various implementations of the examples disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A communication method, performed with at least one circuit, comprising:

receiving a request for an application, running on a first device, to communicate data over a network to a destination storage coupled to a second device, the request including identification information about the second device;

in response to resources having been allocated for communicating with the destination storage, using the resources to communicate the data from the first device over the network to the destination storage coupled to the second device; and in response to resources having not been allocated for communicating with the destination storage:

reallocating, for communicating with the destination storage, resources allocated for communicating with another destination storage; and communicating the data to the destination storage over the network using the resources that have been reallocated.

2. The method of claim 1, wherein:

the receiving comprises receiving the data to be communicated from the application to the destination storage and information about the destination storage.

3. The method of claim 1, wherein:

the request is a request to communicate the data to the destination storage using Remote Direct Memory Access (RDMA).

4. The method of claim 3, wherein:

the resources are for maintaining at least one RDMA queue pair for communicating with the destination storage.

5. The method of claim 3, wherein the reallocating comprises:

reallocating, for communicating with the destination storage, an RDMA queue of an RDMA queue pair that was, prior to the reallocating, allocated for communicating via RDMA with the another destination storage.

6. The method of claim 1, further comprising:

after transmitting the data to the destination storage, receiving, from the destination storage, a response comprising a response identifier;

in response to a request identifier of the request matching the response identifier, maintaining the allocation of the resources for communicating with the destination storage over the network; and in response to the request identifier not matching the response identifier, deallocating the resources for communicating with the destination storage.

7. A communication method, performed with at least one circuit, comprising:

allocating resources for an application to receive data via Remote Direct Memory Access (RDMA) from a sender over a network;

initiating a timer corresponding to receipt of the data via RDMA from the sender over the network; and in response to expiration of the timer, deallocating the resources allocated for the application to receive the data via RDMA from the sender over the network.

8. The method of claim 7, further comprising:

resetting the timer responsive to receipt of further data via RDMA from the sender over the network.

9. The method of claim 7, wherein:

the allocating comprises allocating an RDMA queue pair for communicating with the sender over the network using RDMA.

10. The method of claim 7, wherein:

the deallocating comprises disconnecting an RDMA connection with the sender.

11. The method of claim 7, wherein:

after allocating the resources for the application, receiving, from the sender, a request to deallocate the resources;

in response to a request identifier matching a resource identifier, deallocating the resources for communicating with the sender; and in response to the request identifier not matching the resource identifier, maintaining the resources for the application to receive data from the sender.

12. A system comprising:

at least one first circuit configured to:

receiving a request for an application, running on a first device, to communicate over a network to a destination storage coupled to a second device, the request including identification information about the second device;

in response to resources having been allocated for communicating with the destination storage, using the resources to communicate data from the first device over the network to the destination storage coupled to the second device; and in response to resources having not been allocated for communicating with the destination storage, reallocate, for communicating with the destination storage, resources allocated for communicating with another destination storage; and communicating the data to the destination storage over the network using the resources that have been reallocated.

13. The system of claim 12, wherein the at least one first circuit is configured to receive the request at least in part by receiving the data to be communicated from the application to the destination storage and information indicating the destination storage.

14. The system of claim 12, wherein the request is a request to communicate the data to the destination storage using Remote Direct Memory Access (RDMA).

15. The system of claim 14, wherein:

the resources are for maintaining at least one queue of an RDMA queue pair for communicating with the destination storage.

16. The system of claim 14, wherein the at least one first circuit is configured to reallocate, for communicating with the destination storage, the resources allocated for communicating with another destination storage at least in part by:

reallocating, for communicating with the destination storage, an RDMA queue that was, prior to the reallocating, allocated for communicating via RDMA with the another destination storage.

17. The system of claim 12, wherein:

the application is a first application, the resources are a first set of resources, and the system further comprises at least one second circuit configured to:

allocate a second set of resources for a second application associated with the at least one second circuit to receive the data via Remote Direct Memory Access (RDMA) from a sender over the network;

initiate a timer corresponding to receipt of the data via RDMA from the first application over the network; and in response to expiration of the timer, deallocate the resources for receiving the data via the RDMA from the first application over the network.

18. The system of claim 17, wherein the at least one second circuit is further configured to:

reset the timer responsive to the receipt of the data via RDMA over the network.

19. The system of claim 17, wherein the at least one second circuit is further configured to:

maintain at least one queue or an RDMA queue pair.

20. The system of claim 17, wherein the at least one second circuit is configured to deallocate the resources at least in part by disconnecting an RDMA connection with the sender.

\* \* \* \* \*